Feb. 6, 1940.  R. C. RUSSELL  2,189,225
AUTOMATIC CLUTCH OPERATING MECHANISM
Filed April 27, 1931   3 Sheets-Sheet 1
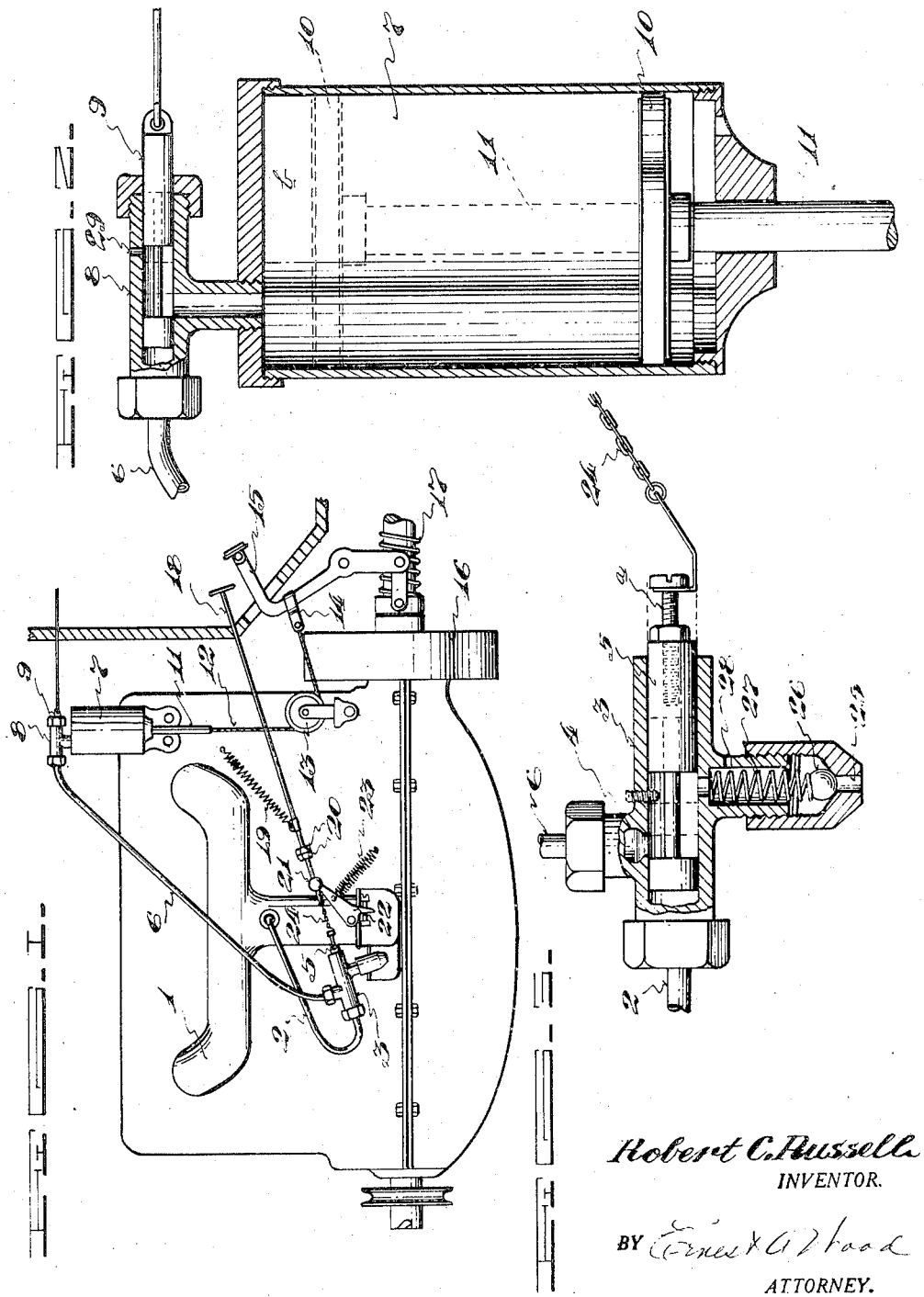
Robert C. Russell
INVENTOR.
BY Ernest A. Wood
ATTORNEY.

Feb. 6, 1940.  R. C. RUSSELL  2,189,225
AUTOMATIC CLUTCH OPERATING MECHANISM
Filed April 27, 1931   3 Sheets-Sheet 2
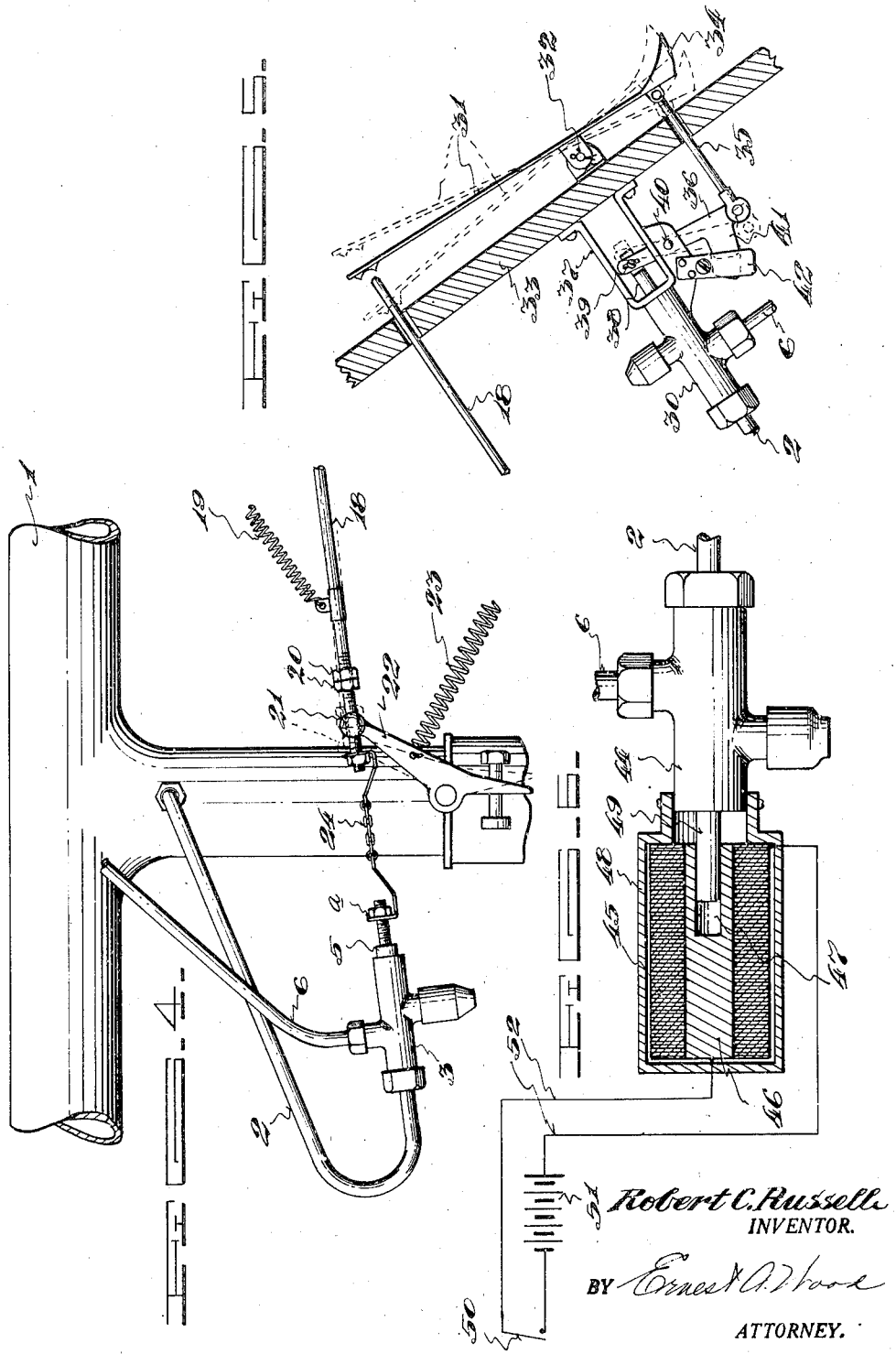
Robert C. Russell
INVENTOR.
BY Ernest A. Wood
ATTORNEY.

Feb. 6, 1940.    R. C. RUSSELL    2,189,225
AUTOMATIC CLUTCH OPERATING MECHANISM
Filed April 27, 1931    3 Sheets-Sheet 3
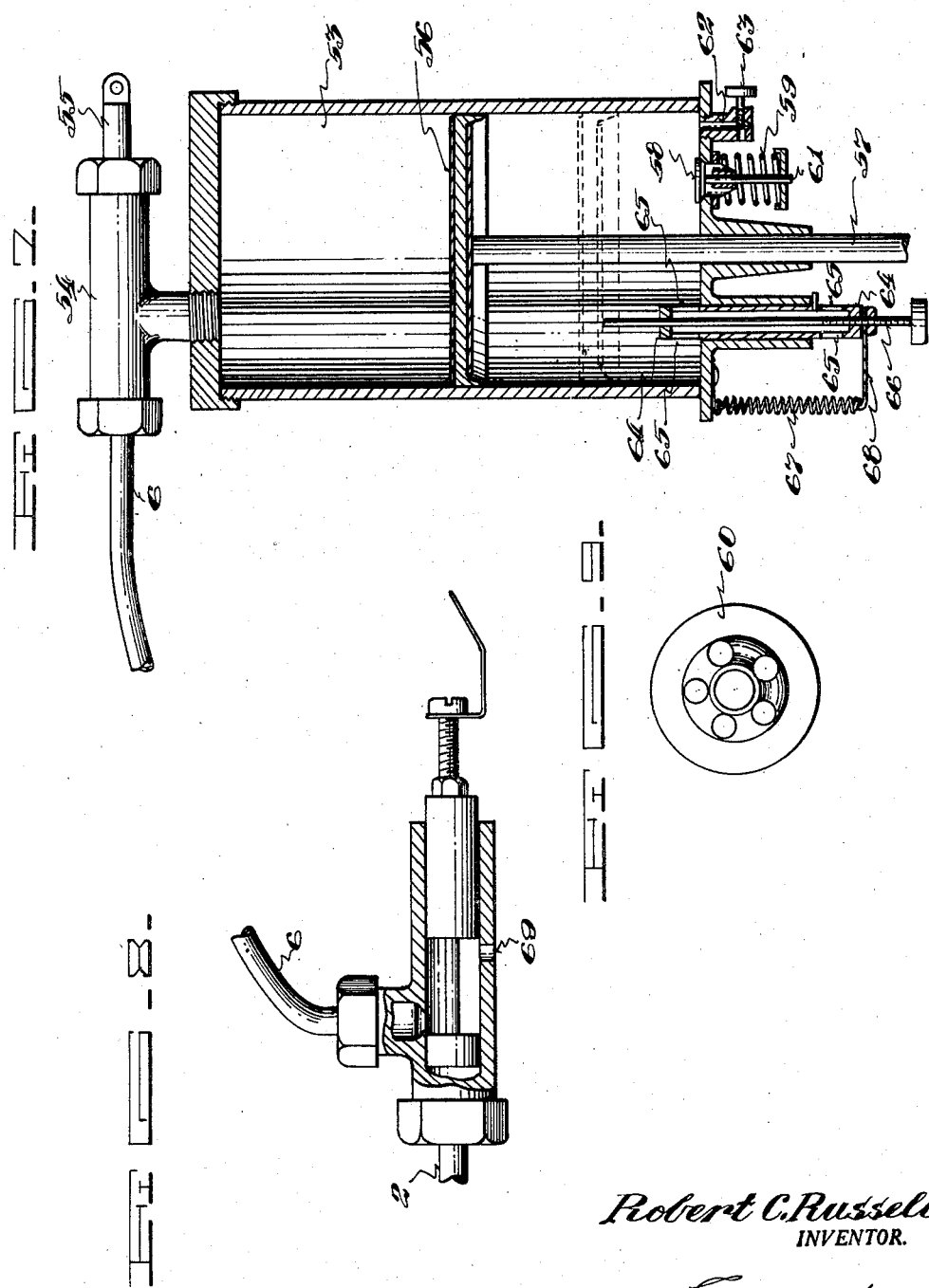
Robert C. Russell
INVENTOR.
BY Ernest A. Wood
ATTORNEY.

Patented Feb. 6, 1940

2,189,225

UNITED STATES PATENT OFFICE 2,189,225

AUTOMATIC CLUTCH OPERATING MECHANISM

Robert C. Russell, Dallas, Tex., assignor to Bragg-Kliesrath Corporation, South Bend, Ind., a corporation of New York Application April 27, 1931, Serial No. 533,128

6 Claims. (Cl. 192—.01)

This invention relates to automatic clutch control mechanism and it has particular reference to a novel arrangement of elements cooperating in combination with certain parts of an internal combustion engine to automatically engage and disengage the clutch of the engine and the principal object of the invention resides in the provision of wholly automatic means operative for releasing the motor from the driving shaft of a vehicle, thereby eliminating the attendant discomfort which results when the speed of the vehicle is greater than the R. P. M. of the motor. When this condition exists, compression of the pistons in the cylinders of the motor resists the speed of the vehicle, and in so doing, the speed of the vehicle is retarded with successive arrestations to the discomfort of the occupants.

Another object of the invention resides in the provision of a clutch control mechanism which may form a composite part of the engine or may be provided as an accessory therefor, capable of being mounted and dismantled at will, but in either case, it is thoroughly automatic in its function in relieving the motor or engine of the strain to which it is ordinarily subjected when its speed falls below that of the vehicle which it propels.

Another object of the invention resides in the provision of a novel valve having a vacuum controlled plunger or piston therein and is normally under the influence of the vacuum pulled in the intake manifold of the engine, the plunger being arranged to control certain ports in the valve when actuated, to indirectly bring about the engaging and disengaging movements of the clutch actuating pedal.

Another and important object of the invention resides in the provision of a compensating means attending the valve. This compensating means is essential in the operation of the invention in that it allows the clutch to be completely engaged before acceleration of the motor takes place and is thereby effective in preventing premature acceleration and in addition to being thus effective, wear upon the clutch and its associated elements is reduced to the very minimum and greater riding comfort is insured.

With the foregoing objects as paramount, the invention has particular reference to its salient features of construction, arrangement and cooperation of its parts, to become manifest as the description proceeds, taken in connection with the accompanying drawings, wherein:

Figure 1 is a side elevation of a motor, showing the intake manifold, clutch and the position of the invention thereon.

Figure 2 is an axial sectional view of the clutch pedal actuating cylinder.

Figure 3 is a view, partly in section of the valve in control of the clutch actuating cylinder.

Figure 4 is an enlarged detail view of the compensating means by which to insure the engagement of the clutch before acceleration of the motor.

Figure 5 is a modified form of the arrangement shown in Figures 1 to 4 inclusive.

Figure 6 is a further modified form of actuating the control valve, showing the application of electromagnetic means, substituting the mechanical means for producing this function.

Figure 7 is a further modified form of the clutch actuating cylinder, showing the compensating means as an integral part thereof.

Figure 8 is a view, partly in section, showing the control valve adapted for use in connection with the clutch actuating cylinder shown in Figure 7, and Figure 9 is a detail view of the relief valve stem guide, which is a part of the clutch actuating cylinder shown in Figure 7.

Heretofore, it has been necessary, in operating the conventional type of motor driven vehicle to disengage the clutch manually in changing gears for stepping up the ground speed of the vehicle. With the customary three speeds, it was necessary to engage and disengage the clutch three times or each time the speed was changed. Control of the vehicle speed or acceleration depended largely upon the skill and precision of the operator since engagement and disengagement of the clutch was accomplished directly by the operator. The present invention comprehends the provision of means controlled by the throttle of the engine or motor to dispense with the requirement for direct operator control of the clutch. When the invention is used, it is not necessary for the operator to move the clutch pedal manually or by his foot in changing gears since the clutch is always out of engagement when the throttle is closed.

With the compensating means, which is an essential part of the invention, slight movement of the throttle to open same is permitted before the clutch is automatically engaged. This permits the motor to speed up slightly and gain in power over idling power before the clutch is engaged. This permits the clutch to slowly move into engagement prior to acceleration of the motor and prevents the accidental jerking which would otherwise occur should the motor be accelerated before engagement of the clutch. With this provision, proper timing is insured, that is to say engagement of the clutch is wholly dependent upon the opening movement of the throttle and the compensating means is automatic in that the clutch can at all times become engaged prematurely, whether the throttle is suddenly or gradually opened.

Accordingly, reference is first made to Figures 1 to 4 inclusive, showing one form of the invention. I designates the intake manifold of the conventional type of internal combustion engine. This manifold is usually provided with a tapped connection and it is to this connection that the tube 2 is joined. For clarification, the character 2 is employed in the modified forms shown in the drawings to indicate this particular tube, it being referred to hereinafter as the vacuum tube and forms the communication between the valve, to be presently described and the engine manifold 1.

With reference particularly to the control valve, attention is directed to Figure 3 which shows the body 3 of the valve having an opening 4 and an attendant relief valve, the elements of which will be characterized later. A plunger 5 is arranged to slide longitudinally within the body of the valve in the manner shown in dotted lines in Figure 3. To the port opening 4 is connected a tube 6, whice tube is connected to another valve atop the control cylinder 7 and designated at 8. This valve 8 has a plunger 9 therein which is very similar to the plunger 5 in the valve shown in Figure 3.

Contained within the cylinder 7 is a piston 10, the rod 11 of which extends downward and through the bottom of the cylinder and to the end of this rod is connected a cable 12, as shown in Figure 1. This cable extends downwardly and under a pulley 13 and its end is connected to a bracket 14, rigidly affixed to the pedal 15 which actuates the clutch 16. It is obvious that through the arrangement shown, movement of the piston 10 in the cylinder 7 in the manner shown in dotted lines in Figure 2 will move the clutch pedal 15 to inoperative or disengaged position, it being pointed out that the clutch spring 17 normally holds the clutch engaged. It will become apparent later in the course of the description how the clutch pedal 15 is pulled down to disengage the clutch 16 when the throttle of the engine is closed.

The conventional accelerator rod 18 is held normally inoperative or back from the floor board by the spring 19, as apparent in Figures 1 and 4. Adjacent the lower or forward end of rod 18, threads are provided to receive stop nuts 20 while a portion of the rod below the nuts 20 is smooth so that it may freely slide through the apertured end 21 of the throttle lever 22 to a limited extent, the travel being limited by the nuts 20. A spring 23, which is of conventional design, holds the throttle lever 22 normally in throttle closed position. To the end of the accelerator rod 18 is connected a chain or other suitable flexible member 24 and the other end of this flexible member is adjustably joined at *a* to the plunger 5 in the valve 3. Thus, the foregoing description is definite in bringing out the connection between the valve 3 with the engine manifold 1, the connection between the valve and the clutch actuating cylinder 7 and the connection between the cylinder 7 and the clutch pedal 15. The description is also definite as to connection between the accelerator rod 18 and the valve 3. A description of the operation of the structure just described will be outlined.

It has been stated that the operator, before changing gears was heretofore required to depress the pedal 15 to disengage the clutch 16. In using the present invention, it being assumed that the motor is running, the operator disregards or does not manipulate the clutch pedal 15 but only depresses the accelerator rod 18 in the usual way. In so doing, the nuts 20 advance toward the throttle control lever 22 without having any effect thereon in view of the provision for the rod 18 to slide unrestrictedly through the end 21 of the lever 22, to a limited extent. It is obvious that the air tension is maintained by the vacuum in the manifold 1 and since the plunger 5 is thus released, the pull afforded by the vacuum through the tube 2, will cause the plunger 5 to move from the position shown in dotted lines in Figure 3 to the position shown in solid lines in the same figure.

It is understood that when the plunger 5 is in the position shown in dotted lines in Figure 3, the cylinder 7 is in direct communication with the engine manifold 1 through the tube 6, valve opening 4 and the tube 2 which connects the valve with the manifold. This being the case, a vacuum is pulled in the chamber *b* of the cylinder 7 or in that portion of the cylinder above the piston 10, it being understood that the dotted position of the plunger 9 of the cylinder valve 8 is the position to which it is moved to render the invention operative. Due to the vacuum pull within the cylinder 7, piston 10 is caused to move upward to the position shown in dotted lines in Figure 2. In so doing, a pull is exerted upon the cable 12 which is transmitted to the clutch actuating pedal 15, causing the same to move to urge the clutch out of engagement.

The position of the elements just described is the position they assume just prior to the opening of the throttle to bring about movement of the plunger 5 in the valve 3 to effect engagement of the clutch. When the plunger 5 is allowed to yield to the vacuum in the manifold 1 in the manner previously mentioned above, the plunger assumes the position shown in solid lines in Figure 3, thereby breaking the communication between the cylinder 7 and the manifold, which is had through tubes 6 and 2 as previously described. Thus, the cylinder 7 communicates with the atmosphere through the tube 6, the passage provided by the reduced portion of the plunger 5 in the valve 3 and the opening 25. As noted in Figure 3 a ball 26, under the control of a spring 27, is thereby held in normally seated position upon the opening 25 and remains so until valve 5 moves to the solid line position of Figure 3 whereupon the cylinder 7 communicates with the atmosphere in the manner described since atmospheric pressure opens the ball valve 26 to admit air into the vacuum in the cylinder 7. When this is done, the piston 10 within the cylinder 7 descends, by reason of the fact that the vacuum within the cylinder 7 is filled by atmospheric pressure through the opening 25, past the ball 26, through the valve 3 and tube 6. As the piston 10 descends within the cylinder 7, the clutch pedal 15, under the pressure supplied by the clutch spring 17, assumes operative position. In other words when the vacuum in the cylinder 7 is filled, the clutch is allowed to engage.

As a further assurance that the piston 10 within the cylinder 7 will descend with sufficient rapidity, there is provided a fixed opening 28 immediately above the opening 25 in the valve 3. The further purpose of this opening 28, which has no effect in preventing the pulling of a suitable vacuum within the cylinder 7 to render the piston 10 operative to disengage the clutch, is to prevent the pulling of a slight vacuum in the cylinder 7, in case of any leakage in the communication between the valve 3 and the manifold 1. Should there be a slight pull within the cylinder 7, the tendency would be to displace the piston 10 and the effect thereof upon the clutch pedal 15 would be obvious. In addition to the fixed opening 28, there is a similar opening 29 in the valve 8 disposed upon the cylinder 7. The purpose of this opening is analogous in that it maintains a pressure rather than a vacuum within the cylinder 7 when the mechanism is inoperative during the time the clutch is in engaged position.

It is of vital importance in the successful operation of the invention that the compensating arrangement just described be present in the construction, without which, movements of the elements of the invention would not be at all times in accord with the varying conditions under which the clutch moves into and out of operative engagement. To explain this condition in greater detail, it is pointed out that in the usual clutch of the disc type, the discs do not always uniformly engage one with the other as the pedal is moved to effect such engagement. This being true, there is a degree of non-uniformity in the pull upon the cable 12 of the invention as the pedal 15, under the influence of the spring 17 is being moved to engage the clutch. Should the invention be allowed to carry out its function with precise uniformity in movement to effect engagement of the clutch, this movement would not be in coordination with the non-uniform movement of the clutch pedal and should the piston 10 be allowed to move rapidly downward within the cylinder 7 without some restraining means, the clutch is likely to become quickly engaged with an obvious result. Therefore, the ball 26 in the atmosphere port of the valve 23, together with the fixed openings 28 and 29 set up a self adjusting arrangement compensating for the differential of movements between the elements of the invention and the clutch and its associated elements.

Referring now particularly to the modified form of controlling means shown in Figure 5, it is pointed out that the valve 30 is substantially the same in construction as the valve 3 previously described. The communicating tubes bear the same characters of reference as the tubes 2 and 6 respectively connecting the valve to the manifold and to the cylinder 7, the latter element of the combination being omitted in the showing in Figure 5, since there is no variation in construction thereof. Figure 5 merely illustrates another form of control in which the clutch and the accelerator are controlled by a single foot treadle 31.

The treadle 31 is pivoted by means of a pin 32 to the floor board 33. In being so pivoted, the upper end thereof is spaced from the end of the accelerator rod 18, so as to allow slight displacement of the treadle 31 before acceleration takes place. On the lower end of the treadle 31 is an integral heel supporting member 34, below which is connected a rod 35 having pivotal engagement with an arm 36.

A bracket mounting 37 is affixed underneath the floor board 33 to support the valve 30 in the manner shown. The plunger 38 of the valve has sliding engagement at 39 with the opposite end of the arm 36 and since the arm 36 is pivoted at 40 to a fixed portion of the bracket 37, downward movement of the lower end of the treadle 31 will actuate the arm 36 on the pivot 40 by reason of the downward urge upon the connecting rod 35. The result of such movement obviously imparts a pull upon the plunger 38 of the valve 10 and an examination of Figure 3 will clearly show the result. The plunger 38, when withdrawn by depressing the lower portion of the treadle 31 will effect communication between the engine manifold 1 and the cylinder 7, through tubes 2 and 6. A vacuum is immediately pulled within the cylinder, to fill which the piston 10 moves upwardly, bringing about a mechanical pull upon the cable 12 to release the clutch. With the construction shown, it is impossible to effect disengagement of the clutch while the motor is running at a high rate of speed, it being pointed out that the flexible relationship between the accelerator or throttle control and the valve actuating mechanism prevents anything but normal operation and proper coordination between the throttle control and the clutch. The same degree of coordination is had in the construction shown in Figure 5 as in the previously described control shown in Figures 1 to 4 inclusive.

With further reference to Figure 5 is it pointed out that the arm 36 has an integral tongue 41 which, when the arm 36 is urged downwardly to actuate the valve 30 is received and held between a pair of flexible members 42, disposed in close relationship so as to frictionally engage the said tongue 41, in the manner shown in dotted lines. The driver is thus enabled to lock the clutch in disengaged position in this manner by maintaining the communication between the manifold 1 and the cylinder 7, which has sufficient power to resist the tendency of the conventional clutch spring 17 to return the clutch to engaged position. This being the case, very little frictional engagement is necessary to hold the arm 36 in operative position to maintain operative position of the valve 30. When the foot is resting normally upon the treadle 31, it is necessary only to depress the upper end thereof, whereupon the throttle will be gradually opened during recession of the plunger 38 of the valve 30 to break the communication between the manifold 1 and cylinder 7, to effect gradual engaging action of the clutch as the speed of the motor increases, by reason of the fact that the cylinder 7 is brought into communication with the atmosphere, as previously explained.

With particular reference to Figure 6, the structure shown therein includes the valve 44, but showing the communicating tubes 2 and 6, respectively connecting the valve to the manifold 1 and cylinder 7 previously described. Attending the valve 44 is a solenoid 45 having the usual core 46 with an axial opening 47. The solenoid casing 48 is so disposed relative to the valve 44 that the plunger 49 therein is received within the opening 47 in the magnet core 46, in the manner shown. The construction of the valve 44 is not unlike the construction shown in cross section in Figure 3 and previously described in detail. Therefore, outward movement of the plunger 49 of the valve shown in Figure 6 effects communication between the manifold 1 and the cylinder 7 as in Figure 1, thereby rendering the cylinder 7 and its piston 10 operative to release the clutch in the manner previously described.

To accomplish the foregoing, that is to say, to bring about a pull upon the plunger 49 of the valve 44, the coil is energized by closing a switch 50, located at some convenient point within the vehicle, preferably on the wheel thereof. In closing this switch, a complete circuit is made through the source 51 to the magnet through the wire 52. Upon energization of the coil, the plunger 49 is displaced to set up a vacuum within the cylinder 7 by effecting its communication with the manifold 1 and to fill this vacuum, the piston 10 moves upwardly, as described previously, bringing about a mechanical pull upon the cable 12, thus releasing the clutch. When the circuit is broken at 50, the vacuum in the manifold 1 will cause the plunger 49 to recede to open the cylinder 7 to atmosphere. This operation allows the piston 10 in the cylinder 7 to recede to allow the clutch pedal 15 to yield to the action of the spring 17, to thereby effect engagement of the clutch 16.

Referring to that part of the description relating specifically to the compensating arrangement obtained through the medium of the ball valve 26 and fixed openings 28 and 29 in the structure shown in Figures 1 to 4 inclusive, Figures 7, 8 and 9 are illustrative of a modified form of self adjusting compensating means. Instead of mounting this means on the valve 3, as shown in Figure 3, it may be mounted in the manner shown in Figure 7 on the cylinder 53. A valve 54, not unlike the valve 8 in Figure 2 is provided on the cylinder 53 and has a plunger 55 for rendering the cylinder and its associated elements inoperative from the dash of the vehicle. The piston 56, of conventional design moves under the influence of vacuum set up within the cylinder 53 as in the previously described structure and the piston rod 57 is similarly connected to the clutch operating pedal.

It frequently happens that there is a very noticeable differential in the movement between the clutch controlling piston 56 and the clutch pedal to which it is flexibly connected. It is desirable to provide an adjustment so that the piston within the cylinder will move in accord with the clutch pedal, that is to say, the speed of the piston in its receding movement should equal the speed of the clutch pedal as the latter moves to effect engagement of the clutch. Of course, the movement of the clutch may depend either upon the condition of the conventional control spring, the condition of the discs with the clutch or other conditions not under the control of the operator, but it is the purpose of the present invention to meet any such condition by providing means to control the elements of the invention in accordance with the movements of the clutch actuating pedal, allowing it to move to engage the clutch at a nominal rate of speed proportionate to the rate of speed at which the throttle is opened and restraining its too rapid movement in bringing about engagement of the clutch.

Accordingly, an opening is provided in the bottom of the cylinder 53, in control of which is a valve 58 and is normally closed by means of a spring 59. The spring seats against a guide 60 for the stem 61 of the valve 58. The function of this valve 58 is not unlike the function of the valve 26 in Figure 3, in that it admits the required amount of air below the piston 56, to allow the latter to move upward when influenced by vacuum thereabove. Attending this valve is an opening 62 having an adjusting screw 63 and the purpose of this latter opening is very much the same as the purpose of the fixed openings 28 and 29 in Figures 2 and 3.

Diametrically opposite the valve 58 is a sliding valve 64. This valve is tubular in form and has ports 65 at both ends and extending through the valve is a threaded rod 66. The valve is held normally in open position by means of spring 67, one end of which is connected to a fixed part of the cylinder 53 and an arm 68 extending outwardly from the lower end of the valve 64.

There are many conditions which might require that the piston 56 be limited in its travel. One of these conditions may be that the cable 12 has become stretched and another, that some of the elements in the clutch have become worn, requiring more extended movement of the clutch actuating pedal. On the other hand certain repairs upon the clutch may change the movement of the pedal. With this in view, the rod 66 is threadedly adjustable in the valve 64 and by threading it upwardly or downwardly, the travel of the piston 56 is limited in that after having engaged the upwardly extended end of the rod 66, in the manner shown in dotted lines in Figure 7, it continues downward, moving the valve 64 with it until the ports 65 are closed at the upper end of the valve. When the ports are closed, the piston 56 ceases its downward movement. This adjustment may be made according to the required movement of the clutch pedal to effect engagement of the clutch and after having effected the adjustment, it will remain unchanged, until a new condition develops which might require another adjustment.

The valve shown in Figure 8 is similar to the valve shown in Figure 3 in cross section with the exception that the atmosphere port is simply a fixed opening 69, in view of the fact that the structure just described and shown in Figure 7 is substituted for the arrangement including the valve 26 and spring 27 shown in Figure 3. The valve is thus simpler in construction and its purpose is only to make and break the communication between the cylinder 53 and the manifold 1 in accordance with the foregoing description.

Manifestly, the construction shown is capable of some modification and such modification as is considered within the scope and meaning of the appended claims is also considered within the spirit and intent of the invention.

What is claimed is:

1. Automatic clutch control mechanism for engines including in combination with the throttle control and intake manifold of said engine, a cylinder and a piston therein having operative connection with said clutch; a valve having connection with said manifold, said cylinder and the atmosphere; a piston in said valve, and a single rod having a lost-motion operating connection interconnected between said throttle control and said valve piston whereby to allow the latter to yield to the vacuum in said manifold when said throttle is opened.

2. Clutch control mechanism for internal combustion engines including in combination with the manifold and throttle control of said engine, means normally maintaining disengagement of said clutch when said throttle is closed, and means controlled by the suction in the manifold and operative upon movement of said throttle control to render said latter means inoperative to effect disengagement of the clutch.

3. Automatic clutch control mechanism for engines including in combination with the throttle control and intake manifold of said engine, a cylinder and a piston therein having operative connection with said clutch; a valve casing operatively connected at one end to the intake manifold, a first port in the casing spaced from the end thereof connected with the intake manifold and connected with the cylinder, a second port in the casing spaced from the first port and connected with atmosphere, a valve piston in said valve casing having a reduced portion intermediate its ends which operatively connects the first and second ports in one position while the piston closes the end of the valve casing, said valve piston being movable so that the end of the valve piston moves beyond the first port to connect the same with the end of the valve casing and close the connection between the first and second ports, and a single rod having a lost-motion operating connection interconnected between said throttle control and said valve piston whereby to allow the latter to yield to the vacuum in said manifold when said throttle is opened.

4. Automatic clutch control mechanism for engines including in combination with the throttle control and intake manifold of said engine, a cylinder and a piston therein having operative connection with said clutch; a valve having connection with said manifold, said cylinder and the atmosphere; said atmospheric connection including, a check valve and an opening of fixed size; a piston in said valve, and means including a lost-motion operating connection interconnected between said throttle control and said valve piston whereby to allow the latter to yield to the vacuum in said manifold when said throttle is opened.

5. In a motor vehicle having a motor, a clutch, a throttle control, and a source of fluid pressure, in combination, a servo-motor connected to operate said clutch, means including a control valve to connect said source of fluid to said servo-motor, an accelerator pedal, a lost motion connection between said pedal and throttle control, means connecting said control valve and said accelerator for full operation of the valve during said lost motion, said valve connecting said servo-motor to said source of fluid pressure to disengage the clutch, or to atmosphere to engage it, and a breather associated with said valve to regulate the flow of atmospheric air through the valve, said breather having means to cause it first to pass a large quantity of air and then a lesser quantity whereby the clutch moves from disengaged to engaged position quickly for a portion of the distance and more slowly for the remainder.

6. Apparatus of the character described comprising a power device having a casing provided with a pressure responsive member to form a suction chamber, said pressure responsive member being connected to an operating member of a motor vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve movable to operative position under the influence of pressure in said chamber upon intial contact of the clutch elements for closing communication through said port, and means operative for affording communication between said suction chamber and the atmosphere after said auxiliary valve is moved to operative position.

ROBERT C. RUSSELL.